US007245931B2

(12) United States Patent
Wang et al.

(10) Patent No.: US 7,245,931 B2
(45) Date of Patent: Jul. 17, 2007

(54) METHOD AND SYSTEM FOR USING COMMON CHANNEL FOR DATA COMMUNICATIONS

(75) Inventors: Chung-Ching Wang, Plano, TX (US); Kim Chang, Richardson, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 804 days.

(21) Appl. No.: 09/952,945

(22) Filed: Sep. 12, 2001

(65) Prior Publication Data

US 2002/0055364 A1 May 9, 2002

Related U.S. Application Data

(60) Provisional application No. 60/232,910, filed on Sep. 15, 2000.

(51) Int. Cl.
*H04B 7/00* (2006.01)

(52) U.S. Cl. ...................... 455/515; 455/458; 370/335; 370/342; 370/349

(58) Field of Classification Search ................ 455/450, 455/455, 434, 511, 512, 515, 516, 517, 68, 455/70, 466, 464, 406, 407, 414, 405, 418, 455/419, 458; 370/328, 329, 335, 337, 336, 370/338, 341, 342, 345, 349, 347, 468; 710/33-35
See application file for complete search history.

(56) References Cited

U.S. PATENT DOCUMENTS 6,011,806 A * 1/2000 Herring ...................... 370/494
6,088,578 A * 7/2000 Manning et al. .............. 455/68
6,621,807 B1 * 9/2003 Jung et al. .................. 370/335
6,728,365 B1 * 4/2004 Li et al. ..................... 379/329
6,845,089 B1 * 1/2005 Gu et al. .................... 370/337
6,954,445 B1 * 10/2005 Wang et al. ................ 370/335

OTHER PUBLICATIONS

Dr. Kourosh Parsa, An Overview of Common Packet Channel (CPCH), an Optimum Wireless Internet Mechanism in 3GPP W-CDMA and Comparison of Various UMTS Non Real Time Data Deployment Options, copyright 2000 IEEE, pp. 388-395.*

Wai Chung Chan, Evaggelos Geraniotis, and Kamran Etemad, Multiple-Code ISMA for Short Burst Data Service in Wireless CDMA Networks, copyright 1999 IEEE, pp. 541-545.*

TR45 *Data Service Options for Spread Spectrum Systems: cdma2000 High Speed Packet Data Service Option 33*; PN-4692.12 (to be published as TIA/EIA/IS-707-A-2.12), Ballot Version, Jan. 2000.

Indian Examination Report dated May 24, 2005 for Indian Application No. 00335/DELNP/2003.

* cited by examiner

*Primary Examiner*—Duc M. Nguyen
*Assistant Examiner*—Wayne Cai
(74) *Attorney, Agent, or Firm*—Haynes and Boone, LLP

(57) ABSTRACT

A method and system is provided for controlling data transfer using a short data burst mechanism between a mobile station (MS) and a base station (BS). After identifying that a short data burst mechanism is desired to be used for transmitting data between the MS and the BS, the data is transmitted over a common channel used for communication between the MS and the BS without having to establish a communication link between the MS and the BS over a traffic channel.

17 Claims, 2 Drawing Sheets

21
22 MS POWERED ON
24 SEND ORIGINATION MESSAGE
26 MOVE TO DORMANT STATE
28 SHORT DATA BURST FROM THE BS
30 RECEIVED?
NO
34 TERMINATE THE CALL
YES
32 CONTINUE CCPD EXCHANGE 10
17
NETWORK
18
PDSU
12
PCF/BS
BSC2
15b
15a
BSC1
BTSa
BTSb
BTSc
BTS1
BTS2
BTS3
20

21
22
MS POWERED ON
24
SEND ORIGINATION MESSAGE
26
MOVE TO DORMANT STATE
28
SHORT DATA BURST FROM THE BS
RECEIVED?
30
NO
YES
34
TERMINATE THE CALL
32
CONTINUE CCPD EXCHANGE 20
76
70
74
72

METHOD AND SYSTEM FOR USING COMMON CHANNEL FOR DATA COMMUNICATIONS

CROSS REFERENCE

This application claims the benefits of U.S. Provisional Patent Application No. 60/232,910, which was filed on Sep. 15, 2000.

BACKGROUND OF THE INVENTION

The present invention relates generally to data communications in a telecommunications network, and more particularly, to a method and system for using a common channel for transporting data information.

In a typical CDMA telecommunication system, once a mobile station (MS) is initialized, it has to acquire a traffic channel before it can exchange data with a base station. Alternatively, the MS can stay in a dormant state while maintaining minimum contact with the base station through a common channel. The cost of using a traffic channel is significant. For example, functionality such as power control, handoff, and channel resource management have to be implemented for supporting the MS to work under the coverage of the telecommunication system because various intelligent features of the traffic channel are very important to the quality of services provided between the base station and the MS.

Although continuous data communication sessions such a telephone conversation may require a good traffic channel, many wireless applications only require short data bursts. For example, stock quotes are sent to the MS only upon request, or an alarm message is sent once every two hours. In each case, the message sent is relatively short and of a known duration (short data bursts). Such short data burst communications may not need to use many features of the traffic channel because the data involved is not continuous, and usually is sent only once in a predetermined period of time.

What is needed is a method and system to enable short data burst communications using the common channel without having to establish a communication link between the MS and the base station over a traffic channel.

SUMMARY OF THE INVENTION

The present invention provides a new and unique system and method for data communications in a wireless network. In one embodiment, a method is provided for controlling data transfer using a short data burst mechanism between a mobile station (MS) and a base station (BS). After identifying that a short data burst mechanism is desired to be used for transmitting data between the MS and the BS, the data is transmitted over a common channel used for communication between the MS and the BS without having to establish a communication link between the MS and the BS over a traffic channel.

The present invention allows the MSs to use less communication resources and perform simpler operations since fewer messages will be required to support the common channel packet data operations. The present invention can be widely utilized for various applications such as remote control, wide area paging, remote data collection, etc.

DESCRIPTION OF THE PREFERRED EMBODIMENT

The present invention enables a mobile station (MS) to transmit/receive short data packets to/from the Packet Data Serving Node (PDSN) over the existing common channel without the need to use the reverse/forward traffic channels. The MS can be a telemetry control device, vending machine inventory control device, pager, etc. For the purposes of describing the present embodiments, various acronyms are used, the definitions of which are listed below.

| | |
|---|---|
| 3G | Third Generation system |
| 3GPP2 | Third Generation Partnership Project 2 |
| A-Key | Authentication-Key |
| ANSI | American National Standards Institute |
| BS | Base Station |
| BSC | Base Station Controller |
| CCPD | Common Channel Packet Data |
| CDMA (cdma) | Code Division Multiple Access |
| EIA | Electronic Industries Alliance |
| f-csch | forward common signaling channel |
| HLR | Home Location Register |
| ISO | International Standards Organization |
| ITU-T | International Telecommunication Union - Telecommunication Sector |
| OTASP | Over the Air Service Provisioning |
| PACA | Priority Access and Channel Assignment |
| PCF | Packet Control Function |
| PDSN | Packet Data Serving Node |
| PPP | Point-to-Point Protocol |
| r-csch | reverse common signaling channel |
| SDB | Short Data Burst |
| SLIP | Serial Line Internet Protocol |
| SSD | Shared Secret Data |
| RLP | Radio Link Protocol |
| PCF | Packet Control Function |
| TIA | Telecommunications Industry Association |
| TSB | Telecommunications Systems Bulletin |
| VLR | Visited Location Register |
| PDSCCF | packet data service call control function |

Figure 1:
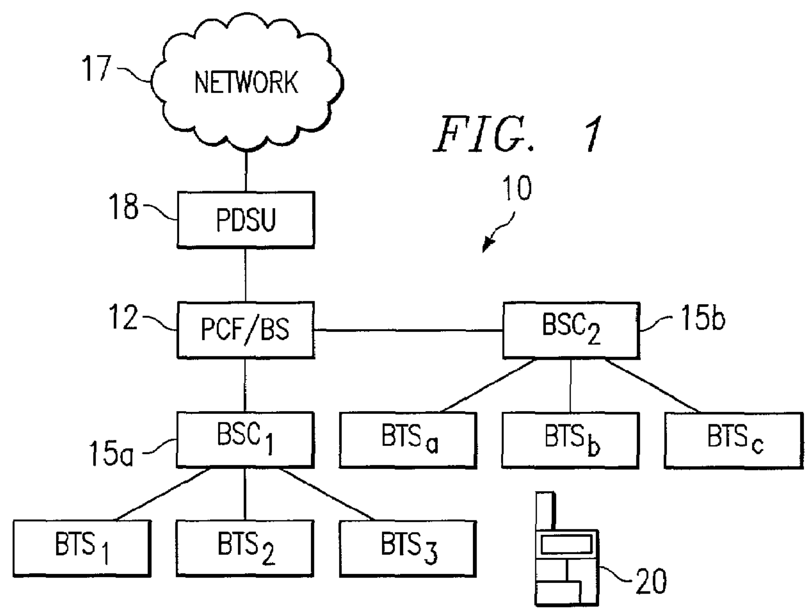
FIG. 1 illustrates a sample wireless communication system.

FIG. 1 illustrates a simplified telecommunication network 10. A base station 12 of the telecommunication network 10 contains at least one Packet Control Function(PCF) unit 14 and multiple base station controllers 15*a* and 15*b*, which further control base transmission station $BTS_1$-$BTS_3$ and $BTS_a$-$BTS_c$, respectively. The base station 12 connects to other parts of the telecommunication network through a Packet Data Serving Node (PDSN) 18. A mobile station (MS) 20 communicates with at least one BTS while it travels, thereby effecting data communication through the telecommunication network 10.

With regard to CDMA technologies, there are generally three layers of protocols for packet data services. They are the Relay Layer, the Link Layer, and the Network Layer. The Relay Layer provides lower layer communication and packet framing between the entities (e.g., the MS or the BTS) of packet data service. The Network Layer deals with IP protocols while the Link Layer is implemented with PPP or SLIP protocols. Specifically related to the present embodiments, the PDSN and the MS use a Link Layer connection to transmit and receive packet data. The PDSN Link Layer connection is opened when a packet data service option is first connected or accepted. Once a PDSN Link Layer connection is opened, a bandwidth (e.g., in the form of Traffic Channel assignment) is allocated to the connection on an as-needed basis. The PDSN Link Layer connection can be in either a closed or opened state. When in the closed state, the PDSN has no Link Layer connection state information for the MS. When the PDSN Link Layer connection is opened, the PDSN has Link Layer connection state information for the MS. The MS maintains the state of the PPP Link Control Protocol (LCP), and manages the PDSN Link Layer connection using the LCP opening and closing procedures as well understood in the industry. On the MS side, if packet data service is in an inactive state, the MS does not provide packet data service, and it only provides packet data service in the active state. The means for determining when the packet data service enters the active state are usually left for the manufacturer of the MS to decide.

The MS performs its PDSCCF in five different states. The PDSCCF is in a null state when the packet data service has not been activated. In an initialization state, the MS attempts to connect a packet data service option. The PDSCCF is in a connected state when a packet data service option is connected, and is in a dormant state when the packet data service option is disconnected. When it is in a reconnect state, the MS attempts to connect a previously connected packet data service option. It is understood that once the MS is activated, it immediately goes to its initialization state. For example, when the MS is turned on initially, the MS will search for available services. When it starts to dial a number, it enters the connected state if the number is successfully dialed. After the initialization state, the MS can also stay inactive or in its dormant state. When it is in its dormant state, the common channel is the communication link between the MS and the BS. It is thus almost mandatory in the conventional method for the MS to go through the initialization state to get to use the common channel or starting its request for a traffic channel.

Figure 2:
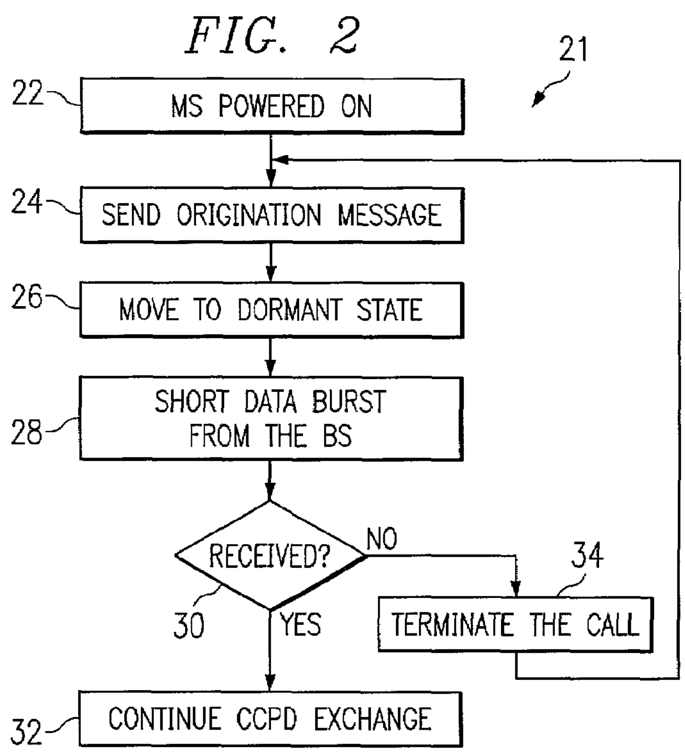
FIG. 2 illustrates a flow diagram for using a common channel for exchanging packet data according to one example of the present invention.

FIG. 2 illustrates a flow diagram 20 for processing CCPD. The MS 20 is first powered on in step 22, and in step 24, sends an Origination message through the common channel to the BS indicating that it desires to use CCPD. The Origination message has a parameter SDB_DESIRED, which can be set to a number (e.g., "1") to evidence the desire of the MS 20. In the mean time, the PDSCCF of the MS 20 makes a transition from its null state to the dormant state in step 26. Once this is accomplished, the MS 20 may start to send CCPD using a predefined Short Data Burst mechanism based on a modified TIA/EIA/IS-707-A standard, which will be described in more details below. In response to the message from the MS 20, the BS sends a short data burst in step 28 on the common channel to the MS 20 indicating that an A-interface (which is defined in the TIA/EIA/IS-2001 standard) has been established successfully. If the MS 20 receives the short data burst sent by the BS (step 30), the MS 20 and the BS have successfully established a communication link therebetween over the common channel for continuing the CCPD exchanges (step 32) (which is also referred to as a CCPD mode). If the MS 20 fails to receive the short data burst, it can either send the Origination message again or terminate the call altogether in step 34. Also possible is that it can switch to use the traffic channel for future communications if the MS 20 relinquishes the expectation to use the common channel to exchange the CCPD.

Two changes have to be made to both the existing TIA/EIA-707-B and TIA/EIA/IS-2000.5-B standards, both of which are hereby incorporated by reference. For the TIA/EIA/IS-2000.5-B standard, a new parameter SDB_DESIRED is added to the Origination Message. If the MS 20 desires to exchange packet data using only short data bursts, it may set this parameter to '1'. Otherwise, it may set this field to '0'.

Figure 3:
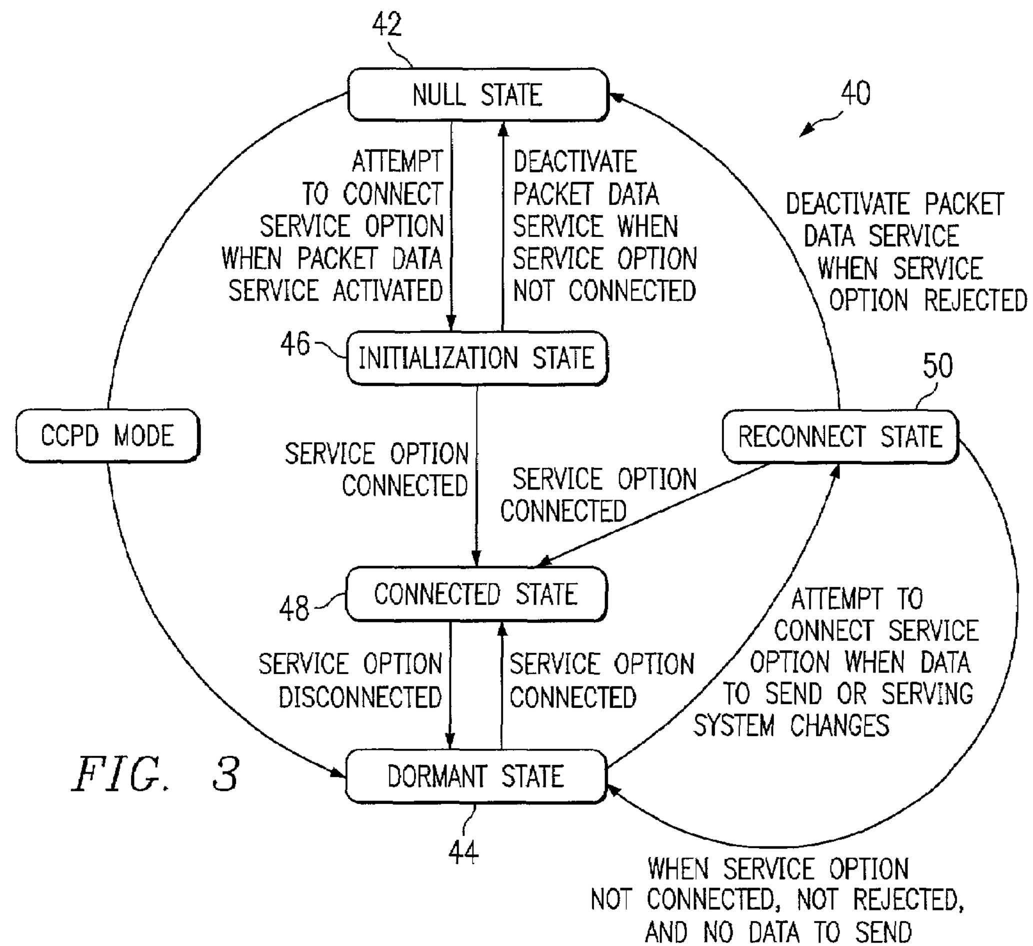
FIG. 3 illustrates a state transition diagram for a packet data service call control function in a mobile station according to one example of the present invention.

In order to conform to the TIA/EIA-707-B standard, the relevant standard protocol for the state transition from the null state to the dormant state for the PDSCCF in the MS 20 has to be modified. FIG. 3 illustrates a diagram 40 showing the modified state transitions of the PDSCCF of the MS 20. It is understood that the PDSCCF is in the Null State 42 whenever the packet data service is in the Inactive State. If the packet data service enters the Active State, the PDSCCF may start to change states. If the MS 20 is in the Mobile Station Idle State, or when the MS 20 enters the Mobile Station Idle State, and if the MS 20 attempts to use only common channel short data burst (CCPD mode), the PDSCCF may enter the Dormant State 44 directly. Otherwise, the MS 20 may initiate a connection of the packet data service option, thereby having the PDSCCF enter its initialization state 46. If in the initialization state 46 and the service option is not connected, the packet data service will be deactivated, and the PDSCCF moves back to the Null State. On the other hand, from the Initialization State, if the service option is connected, the connected state 48 of the PDSCCF is entered, and if the service option is disconnected thereafter, the dormant state 44 is reached. From the dormant state, if the service option is connected, the PDSCCF moves back to the Connected State. However, if the MS 20 attempts to connect service option when there is data to be sent or a change in the serving system such as the BS, the PDSCCF enters a Reconnect State 50 accordingly. From the Reconnect State, the PDSCCF can return back to the Dormant State when the service option is not connected, but not rejected, and there is no data to be sent. The PDSCCF can also enter the Connected State 48 if the service option is connected, and it can return back to the Null State 42 when the service option is rejected, whereby the packet data service is deactivated. Further details about the states that the packet data service are in are delineated below.

Null State

The MS 20 PDSCCF is in the Null State whenever the packet data service is in the Inactive State.

Active State

If the packet data service enters its Active State, the MS 20 may perform as follows:

If the Network Layer $R_m$ interface protocol option is selected, and the $R_m$ interface Link Layer is implemented using PPP, the MT2 may initiate PPP configuration on the $R_m$ interface.

If the MS 20 is in the Mobile Station Idle State, or when the MS 20 enters the Mobile Station Idle State, the MS 20 may initiate connection of the packet data service option. The PDSCCF may enter the Initialization State.

If the MS 20 supports concurrent services signaling, and the MS 20 is in the Mobile Station Control on the Traffic Channel State, the MS 20 may initiate connection of the packet data service option, as described. The PDSCCF may enter the Initialization State.

If the PDSCCF enters the Null State, the MS 20 may indicate to the base station that the packet data service is inactive. The MS 20 may disconnect the packet data service option, if connected, and if the MS 20 does not support concurrent services signaling, the MS 20 may disconnect the call.

Initialization State

While the PDSCCF is in the Initialization State, the MS may perform as follows:

If the packet data service option is connected, the PDSCCF may enter the Connected State when the call control instance enters the Conversation Substate.

If the MS 20 receives an indication from the base station that CCPD mode is accepted, the PDSCCF may enter the Dormant State. The packet data service may enter the Inactive State if either the packet data service option cannot be connected or accepted, or the MS 20 enters the Initialization State, or the MS 20 exits the System Access State and enters any state other than the Mobile Station Control on the Traffic Channel State.

If the packet data service enters the Inactive State, the PDSCCF may enter the Null State.

Connected State

When the packet data service call control function enters the Connected State, the MS 20 begins an RLP initialization process. While in the Connected State, if the MS 20 exits the Mobile Station Control on the Traffic Channel State, the PDSCCF may enter the Dormant State.

The MS 20 may maintain a packet data inactivity timer. The value of this timer may preferably not be less than 20 seconds. The timer can be reset whenever a non-idle RLP data frame is sent or received. If the packet data inactivity timer expires, the MS 20 may disconnect the packet data service option. If the packet data service option is disconnected, the PDSCCF may enter the Dormant State. If the packet data service enters the Inactive State, the PDSCCF may enter the Null State. When the amount of user data in the MS 20 reaches a predefined threshold, the MS 20 may request reverse high speed operation as it is known in the industry.

Dormant State

While the PDSCCF is in the Dormant State, the MS 20 may store the current value of SID, NID, and PACKET_ZONE_ID$_S$. If the packet data service option is connected, the PDSCCF may enter the Connected State when the relevant call control instance enters the Conversation Substate. If the packet data service enters the Inactive State, the PDSCCF may enter the Null State. If the packet data service has data to send and the MS 20 chooses to use a short data burst to send the data, the MS 20 may send the short data burst.

The MS 20 may maintain a packet data dormant timer controllable by the base station. The default value for this timer may be 0 seconds. The timer may be reset upon entering the Dormant State. The MS 20 may delay any attempt to request a packet data service option until the expiration of this timer. The MS 20 may clear the reconnect delay timer.

If the MS 20 is in the Mobile Station Idle State, the MS 20 may initiate a connection of the packet data service option. The PDSCCF may enter the Reconnect State.

If the MS 20 does not support concurrent services signaling, and the MS 20 is not in the Mobile Station Idle State, the MS 20 may wait until entering the Mobile Station Idle State to begin initiating connection of the packet data service option.

If the MS 20 supports concurrent services signaling, and the MS 20 is in the Mobile Control on the Traffic Channel State, the mobile may initiate the connection of the packet data service option. The PDSCCF may enter the Reconnect State.

Reconnect State

While the PDSCCF is in the Reconnect State, if the packet data service option is connected, the PDSCCF may enter the Connected State when a call control instance enters the Conversation Substate.

If the MS 20 receives an indication from the base station that the CCPD mode is accepted, the PDSCCF may enter the Dormant State.

If the MS 20 receives an indication from the base station that the packet data service option is rejected, the packet data service may enter the Inactive State.

If the packet data service option is not connected and the packet data service option has not been rejected, and the MS 20 has data to send, the MS 20 may perform in a few ways. In one situation, the MS 20 may discard the data. If the MS 20 has received an indication from the base station that the MS 20 may delay its next attempt to connect the packet data service option, the MS 20 may set a reconnect delay timer to a time indicated by the base station. The PDSCCF may enter the Dormant State.

If the packet data service option is not connected and the packet data service option has not been rejected, and the MS 20 does not have data to send, the PDSCCF may enter the Dormant State.

If the packet data service enters the Inactive State, the PDSCCF may enter the Null State.

Figure 4:
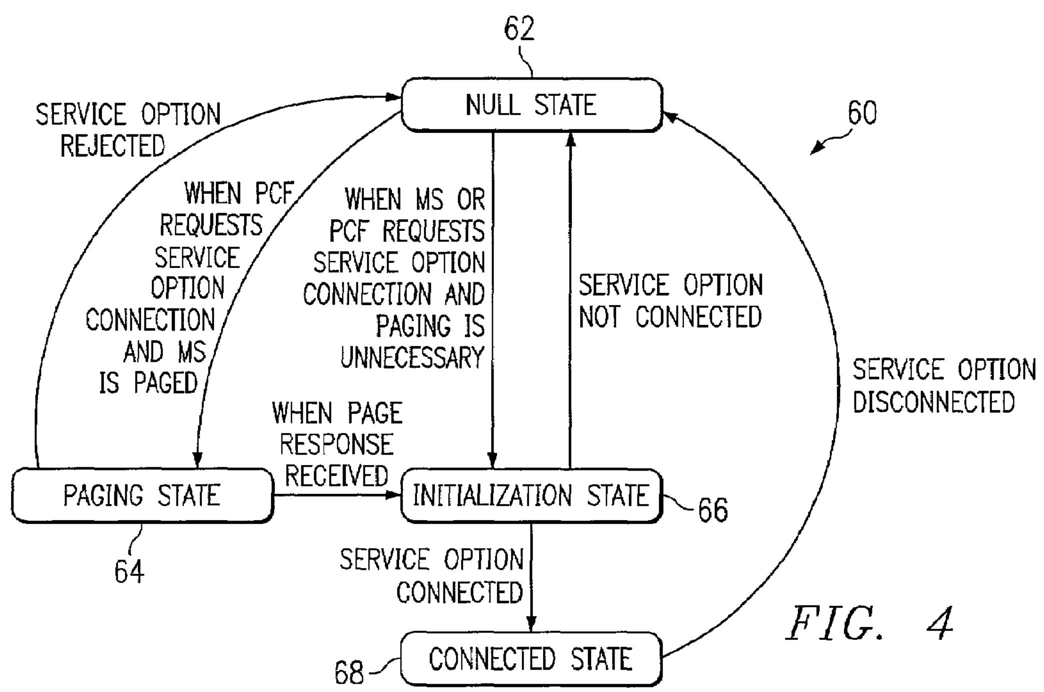
FIG. 4 illustrates a state transition diagram for a packet data service call control function in a base station according to one example of the present invention.

FIG. 4 is a state diagram 60 illustrating various states of the PDSCCF for the BS. From the perspective of the BS and its PCF, similar to the MS 20, its PDSCCF also shifts states for providing data services. There are generally four major states. Null State 60, Paging State 64, Initialization State 66, and Connected State 68. In the Null State, the BS has no connection of a packet data service option to the MS 20. In the Paging State, the PCF has requested that the base station connects a packet data service option, and the base station has paged the MS 20. When in the Initialization State, the base station awaits connection of a packet data service option. While in the Connected State, a packet data service option has been connected.

Null State

When the base station packet data service call control function is in the Null State, the packet data service option is not connected. When in this state, the MS 20 can request connection of a packet data service option. The PCF can request the base station to send a short data burst to the MS 20 through the common channel. The PCF can request the base station to connect the packet data service option.

PCF Initiated Service Option Connection

If the PCF indicates to the BS that the MS 20 is operating in the CCPD mode and the PCF requests the BS to send a short data burst, the BS may then send the short data burst. If the base station chooses not to use a short data burst to send the data, the base station may inform the PCF that it does not accept the data.

If the PCF requests the BS to connect a packet data service option, and if the MS 20 is in its Mobile Station Idle State, the base station may page the MS 20, thereby requesting the packet data service option. The PDSCCF of the BS may then enter the Paging State.

If the MS 20 is not in the Mobile Station Idle State, and the MS 20 does not support concurrent services signaling, the BS may indicate to the PCF that the MS 20 is busy. On the other hand, if the MS 20 is in the Mobile Station Control on the Traffic Channel State, and the MS supports concurrent services signaling, the PDSCCF may enter Initialization State.

Mobile Station Originated Service Option Connection

If the base station receives a request to connect a packet data service option from the MS 20, and if the service option requested by the MS 20 is not supported, the BS may reject the requested service option.

If the CCPD mode is being requested, and if the BS chooses not to support it, the base station may reject the service option.

If the CCPD mode is being requested, and if the BS chooses to support it, the BS may inform the PCF that the mobile is attempting so. The BS then performs the following:

If the PCF accepts the CCPD connection, the BS may send a short data burst, with its CCPD bit set to 1, to the MS 20. The BS may not connect the packet data service option.

If the PCF rejects the CCPD connection, the BS may not connect the requested service option, and may indicate to the MS 20 that the requested service option has been rejected.

If the PCF defers the packet data connection, the BS may not send a short data burst, nor may the BS indicate to the MS 20 that the packet data service option was rejected.

Otherwise, the BS may inform the PCF that the mobile is attempting to connect the packet data service option. If so, the BS then performs the following:

If the PCF accepts the packet data connection, the PDSCCF may enter the Initialization State.

If the PCF rejects the packet data connection, the BS may not connect the requested service option, and may indicate to the MS 20 that the requested service option has been rejected.

If the PCF defers the packet data connection, the BS may not connect the requested service option, and may not indicate to the MS 20 that the packet data service option was rejected.

Paging State

When the base station PDSCCF is in the Paging State, and if the BS receives a Page Response Message containing the same packet data service option number that was used to page the MS 20, the PDSCCF may enter the Initialization State.

If the BS does not receive a Page Response Message, the BS may inform the PCF that the request for the packet data service option has been rejected. The PDSCCF may enter the Null State.

If the BS receives a Page Response Message with a service option that is different than the service option sent in the page, the BS may send a Release Order rejecting the requested service option. The BS may inform the PCF that the request for the packet data service option has been rejected. The PDSCCF may enter the Null State.

Initialization State

When the base station PDSCCF enters the Initialization State, the BS may attempt to connect the packet data service option.

If the packet data service option is connected, the PDSCCF may enter the Connected State. If the packet data service option cannot be connected, and if the MS 20 does not support concurrent services signaling, the BS may disconnect the call. The BS may inform the PCF that the MS 20 has rejected the connection attempt. The PDSCCF may enter the Null State.

Connected State

When the base station PDSCCF enters the Connected State, the base station may inform the PCF that the packet data service option has been connected. The BS may perform an RLP initialization. Upon completing RLP initialization, the BS may transfer octets in sequence between RLP and the PCF.

If the PCF requests the BS to disconnect the packet data service option, the BS may disconnect the packet data service option. If the MS 20 does not support concurrent services signaling, the BS may disconnect the call. The PDSCCF may enter Null State.

While the PDSCCF is in the Connected State, the BS may maintain a packet data inactivity timer. The timer may be reset whenever non-idle RLP data frames are sent or received. If the packet data inactivity timer expires, the BS may disconnect the packet data service option. The BS may inform the PCF that the packet data service option has been disconnected. The PDSCCF may enter the Null State.

Initialization and Connection of Packet Data Service Options

The MS 20 may initiate a connection of a packet data service option by requesting the packet data service option in either a Page Response Message, Enhanced Origination Message, or Origination Message. When the MS 20 sends an Origination Message or an Enhanced Origination Message, the MS 20 may indicate whether it has data to send (e.g., by setting the DRS bit in the message sent by the MS 20).

The MS 20 may indicate if the CCPD mode is desired (e.g., by setting the SDB_DESIRED_ONLY bit in the message sent by the MS 20). If the MS 20 has stored a value of SID and if the stored value of SID is different than the current value of SID, the MS 20 may include the stored value as the value of the previous SID. Otherwise, the MS 20 may not include the stored value. If the MS 20 has stored a value of NID and if the stored value of NID is different than the current value of NID, the MS 20 may include the stored value as the value of the previous NID. Otherwise, the MS 20 may not include the stored value.

If a packet zone based reconnection is enabled and if the MS 20 has stored a value of $PACKET\_ZONE\_ID_S$ and if the stored value of $PACKET\_ZONE\_ID_S$ is different than the current value of $PACKET\_ZONE\_ID_S$, the MS 20 may include the stored value as the value of the previous packet zone identifier. Otherwise, the MS 20 may not include the stored value.

If the MS PDSCCF is in the Dormant State, the MS 20 may set the SR_ID field to the value assigned to the last packet data service option connection for this packet data service.

After initiating a connection of a packet data service option, the MS 20 connects the service option.

Referring back to FIG. 1, in certain situations when after the MS 20 sends a data packet to the BSC 15*a* and if the BSC can not transfer the data to the PDSN 18 due to reasons such as a shortage of the network resources, the BSC may reply to the MS 20 with a Retry Order message with a none-zero value in its RETRY_DELAY parameter as opposing to a zero value if the BSC transfers the data to the PDSN 18 successfully. When the MS 20 receives the Retry Order, it delays the data retransmission according to the Retry Order and switches to the Dormant State.

Implementing the present invention in the existing telecommunication network, an MS 20 needs to support mobile authentication on the common channel. The mobile authentication process for the MS 20 is the same as that for a regular mobile device as defined in IS-2000 standard except that the authentication process can be done on the common control channel.

In one example, a Unique Challenge-Response Procedure is initiated by the BS 12 and may be carried out either on the f-csch or r-csch. First, the BS 12 generates a 24-bit quantity RANDU and sends it to the MS 20 in a Authentication Challenge Message on the f-csch. Upon receiving the Authentication Challenge Message, the MS 20 sets input parameters of an Auth-Signature procedure, using RANDU, IMS 20I_S2, IMS 20I_S1, ESN, SSD_A, etc. The MS 20 then executes the Auth-Signature procedure. An 18-bit output AUTH-SIGNATURE shall be used to fill an AUTHU field of the Authentication Challenge Response Message, which will be sent to the BS 12 on the r-csch. The BS 12 computes the value of AUTHU in the same manner as the MS 20 but using its internally stored value of SSD_A. Then the BS 12 compares its computed value of AUTHU to the value received from the MS 20, and if the comparison fails, the BS 12 may deny further access attempts by the MS 20, drop the call in progress, or initiate the process of updating the SSD. To update an SSD, the MS 20 also uses an SSD Updating process similar to the conventional method as defined in IS-2000 except the common control channel is used.

One MS 20 supports only three Layer 3 processing states: Mobile Station Initialization State, Mobile Station Idle State, and System Access State. The procedures for MS 20 in the Mobile Station Initialization State and Mobile Station Idle State are the same as that those specified in IS-2000. When the MS 20 is in the System Access State, if the MS uses the short data burst mechanism to send the data to the PDSN, it uses Data Burst Message. If the BS responds with an Authentication request, the MS 20 performs the authentication process. In the IS-2000 standard, this substate is termed as a Mobile Station Message Transmission substate.

In one example, the authentication process can be performed in two ways. When the BS 12 receives the first data packet from the MS 20, the BS may challenge the MS 20 to authenticate. In this way, the BS 12 need not be aware of the MS 20 that supports the CCPD feature, or at least not before it sends data packets. When the MS 20 registers, the BS 12 may challenge the MS 20 to authenticate. In this way, the BS 12 will be aware of the MS 20 that supports the CCPD feature or not when registering. However, registration messages should be modified to identify a MS 20 that supports the CCPS feature.

In another example, when the BS receives a short data burst from a common channel, it will send an A9_Setup_A8 message to the PCF. Upon receiving the message, the PCF initiates the procedure for establishing an A10/A11 connection. After establishing the A10/A11 connection (e.g. PPP link), the PCF sends an A9-Connect-A8 message to the BSC. The BS then sends the data packet to the PDSN via the PCF.

The MS 20 may also end an on-going packet data service by sending a conventional Release Order message to the BS 12 to release the service via the r-csch. When the BS 12 receives the Release Order, it sends a A9-Release-A8 message to the PCF. The PCF disconnects the A10/11 connection between the PDSN and the PCF. After the PPP link is released, the PCF responds with an A9-Release-A8 Complete message. Then, the A8 connection is also released. Since no traffic channel is used for the MS 20, the Release Order message is used to release the A8/A9, A10/A11 connection.

If the A10/A11 connection can not be established, the PCF sends an A9-Release-A8 Complete message to the BS 12 to release the A8/A9 connection. At the same time, the BS 12 responds to the MS 20 with a Retry Order message and discards the received packet. The Retry Order message gives delay information for future attempts of the MS 20. Similarly, if the A8/A9 connection can not be established, the BS responds to the MS 20 with a Retry Order message and discards the received packet.

Figure 5:
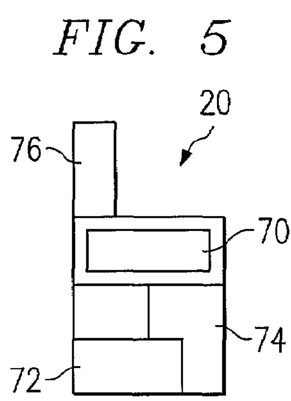
FIG. 5 illustrates key components of a mobile station.

FIG. 5 illustrates key elements of an MS 20. It has a display area 70, a processor unit 72 processing instructions to provide intelligence to the rest of the circuitry on the MS 20. It also has a memory unit 74 working in conjunction with the processor unit 72. Instructions for functions such as the packet data service call control function are processed using both the processor unit and the memory unit 74. The MS 20 also has a transceiver unit 76 which transmits or receives data under the guidance of instructions sent by the processor unit 72.

According to the present invention, by using the common channel to transfer data, MSs use less network resources (common channels only), perform simpler operations (fewer messages will be required to support CCPD operations), and can be widely utilized for various applications such as remote control, wide area paging, remote data collection, etc.

The above disclosure provides many different embodiments, or examples, for implementing different features of the invention. Also, specific examples of components and processes are described to help clarify the invention. These are, of course, merely examples and are not intended to limit the invention from that described in the claims.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for controlling data transfer using a short data burst mechanism between a mobile station (MS) and a base station (BS), the method comprising the steps of:

identifying that a short data burst mechanism is desired to be used for transmitting data between the MS and the BS, wherein the identifying comprises transmitting an Origination message from the MS to the BS over the common channel; and transmitting the data over a common channel used for conmiunication between the MS and the BS without having to establish a communication link between the MS and the BS over a traffic channel;

wherein the Origination message includes an SDB_DESIRED parameter that, when set to a first value, causes the short data burst mechanism to be used for transmitting data between the MS and the BS.

2. The method of claim 1 wherein the step of transmitting further includes:

transiting a packet data control function module from a null state to a dormant state; and awaiting an indication from the BS for completing an establishment of a communication link to transmit the data over the common channel.

3. The method of claim 2 further comprising terminating the transmitting if there is no indication from the BS for completing the establishment of the communication link.

4. The method of claim 2 wherein the step of transmitting further includes providing to the BS by the MS an indication again if there is no indication from the BS for completing the establishment of the communication link.

5. The method of claim 1 wherein the step of transmitting further includes responding with a short data burst message from the BS to the MS indicating the establishment of the communication link.

6. The method of claim 1 further comprising re-transmitting the data based on an instruction given in a response message sent back from the BS after the BS is aware of the desire of the MS to send data.

7. The method of claim 6 wherein the response message is a Retry Order message.

8. The method of claim 1 further comprising authenticating the MS by the BS through the common channel.

9. A mobile station (MS) for transferring data using a short data burst mechanism between the MS and a base station (BS), the system comprising:

a processor unit identifying that a short data burst mechanism is desired to be used for transmitting data between the MS and the BS; and a transceiver unit for transmitting the data over a common channel used for communication between the MS and the BS without having to establish a communication link between the MS and the BS over a traffic channel;

wherein the processor unit further comprises instructions for transmitting an Origination message from the MS to the BS over the common channel;

wherein the Origination message includes an SDB_DESIRED parameter that, when set to a first value, causes the short data burst mechanism to be used for transmitting data between the MS and the BS.

10. The system of claim 9 wherein the processor unit further includes:

instructions for transiting a packet data control function module from a null state to a dormant state; and instructions for awaiting an indication from the BS for completing an establishment of a communication link to transmit the data over the common channel.

11. The system of claim 9 wherein the processor unit further includes instructions for terminating the transmitting if there is no indication from the BS for completing the establishment of the communication link.

12. The system of claim 9 wherein the processor unit further includes instructions for providing to the BS by the MS an indication again if there is no indication from the BS for completing the establishment of the communication link.

13. The system of claim 9 wherein the processor unit further includes instructions for re-transmitting the data based on an instruction given in a response message sent back from the BS after the BS is aware of the desire of the MS to send data.

14. A base station (BS) for transferring data using a short data burst mechanism between a mobile station (MS) and the BS, the system comprising:

a packet control function unit identifying that a short data burst mechanism is desired to be used for transmitting data between the MS and the BS by transmitting an Origination message from the MS to the BS over the common channel; and a base transmission unit for transmitting the data over a common channel used for communication between the MS and the BS without having to establish a communication link between the MS and the BS over a traffic channel;

wherein the Origination message includes an SDB_DESIRED parameter that, when set to a first value, causes the short data burst mechanism to be used for transmitting data between the MS and the BS.

15. The system of claim 14 wherein the packet control function unit further includes instruction for responding, after receiving a first short data burst message from the MS, with a second short data burst message to the MS indicating the establishment of the communication link over the common channel.

16. The system of claim 15 wherein the second short data burst message is a Retry Order message.

17. The system of claim 14 wherein the packet control function unit further includes instructions for authenticating the MS through the common channel.

* * * * *